United States Patent Office 2,935,078
Patented May 3, 1960

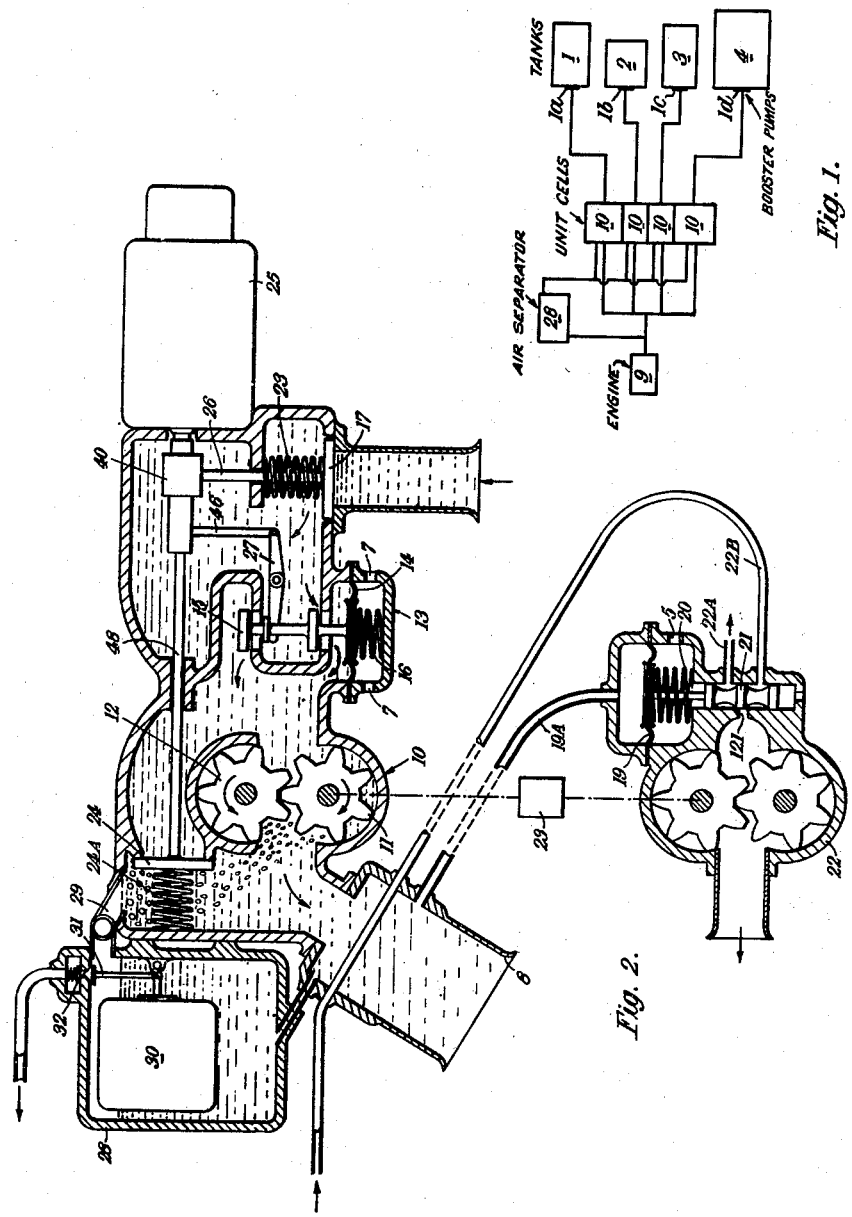

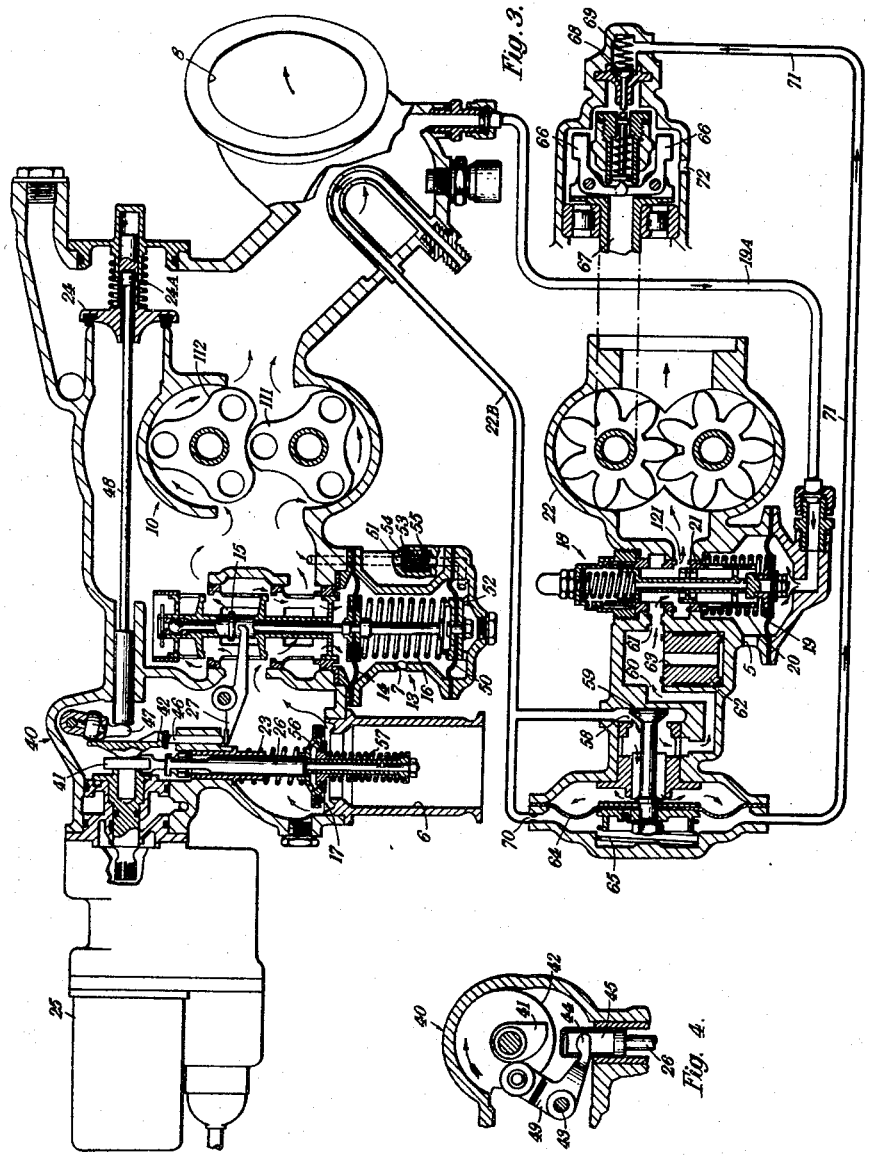

2,935,078

FUEL FLOW PROPORTIONERS

Leonard Sidney Greenland, Tettenhall, William Donald McCourty, Wolverhampton, and Thomas Edwards, Codsall, England, assignors to H. M. Hobson Limited, London, England, a British company Application May 6, 1958, Serial No. 733,307

Claims priority, application Great Britain May 7, 1957

18 Claims. (Cl. 137—99)

This invention relates to mechanical fuel flow proportioners of the type comprising a plurality of positive displacement flow proportioning devices for delivering to a common outlet fuel from associated supply sources at different pressures. In fuel flow proportioners of this type each flow proportioning device is normally constituted by a pair of inter-meshing gears, and the amount of fuel proportioned by each proportioning device is dependent both upon the size and the width of the gears and also upon the speed of rotation of the gears. When fuel flows through the gears there will be a pressure drop across them, and, due to this pressure drop and to a clearance between the tips and sides of the gears and the chamber enclosing them, there will be leakage which will cause the proportioning to be inaccurate.

It is an object of the present invention to provide a fuel flow proportioner of the above-mentioned type wherein the pressure drop across each proportioning device and therefore the leakage and resultant mal-proportioning are substantially eliminated.

The invention accordingly provides a mechanical fuel flow proportioner of the above type comprising in association with each source a flow proportioning device matched to its source as regards both displacement and speed, said proportioning devices being operative to feed fuel continuously in predetermined proportions from the several sources to a common outlet, a device responsive to the common output pressure of the proportioning devices from maintaining said output pressure at a predetermined value, and a device associated with each proportioning device for maintaining its input pressure substantially equal to its output pressure.

The proportioning devices may be independently driven but we prefer to drive them all at the same speed by a common prime mover as it is then necessary only to match them in terms of displacement to their respective sources to obtain the required proportionality in the flow from the sources.

The invention includes a fuel flow proportioner of the above type including in association with each source a flow proportioning device comprising inter-meshing rotors mounted to rotate within a casing and matched as regards displacement to the associated source, a compressed air motor connected to drive all the flow proportioning devices, a control valve connected between the input to the air motor and a source of pressurised air, a device responsive to the common output pressure of the flow proportioning devices for controlling said valve to maintain said output pressure at a constant value, a pressure regulating valve disposed between each flow proportioning device and its associated source and a device sensitive to the input pressure to each flow proportioning device for adjusting its pressure regulating valve to maintain said input pressure substantially equal to said common output pressure.

The rotors of each flow proportioning device accordingly act as a pump to deliver fuel from the associated source to the common outlet and the air motor is of course capable of changing speed in response to change in the load on the flow proportioning devices.

Two alternative forms of fuel flow proportioners according to the invention will now be described in detail by way of example with reference to the accompanying drawings in which:

Fig. 1 is a block diagram of the first form of proportioner,

Fig. 2 is a diagrammatic view of said first form of proportioner but showing one of the flow proportioning devices only, Fig. 3 is a diagrammatic view similar to that of Fig. 2, showing the second form of proportioner and Fig. 4 is a detail view of the cam mechanism utilised in both forms of proportioner.

Like reference numerals indicate like parts throughout the figures.

In Fig. 1 fuel supply tanks of differing sizes are indicated at 1, 2, 3 and 4. 1a, 1b, 1c and 1d are booster pumps for the tanks and the fuel from each of the tanks is supplied to an engine 9 through an individual inter-meshing gear flow proportioning device 10.

It is required that equal proportions of fuel shall flow from the tanks, so that, for example, when the system is used in an aircraft the mass balance of the aircraft shall not be disturbed. The exact proportion allowed to flow from each tank, as previously stated, is dependent upon the size and width of the gears of the associated proportioning device. The gears of one of the proportioning device 10 are designated in Fig. 2 as 11 and 12. The speed of the proportioning devices 10 in the illustrated embodiment is the same as they are all driven by a common motor 22 (Fig. 2) driven by compressed air. As the tanks are of different sizes and they will usually be in different head positions the booster pumps 1a—1d will have to provide different pressures. It therefore becomes necessary to provide, in association with each proportioning device 10 a device for reducing these pressures to a common value in order to ensure that all the proportioning devices will receive fuel at the same input pressure, in view of the fact that the output pressures of all the proportioning devices 10 must necessarily be the same, having regards to the fact that their outputs are supplied to a common manifold 8 (Fig. 2) leading to the engine 9 (Fig. 1). This pressure reducing device, shown at 13 in Fig. 2, comprises a diaphragm 14 having its lower face exposed to ambient atmospheric pressure applied thereto through inlets 7 and its upper face exposed to the pressure existing at the downstream side of a pressure regulating valve 15. The difference in pressure between ambient pressure and the required downstream pressure is balanced by a spring 16, and the device 13 is so designed as to produce a pressure drop across itself such that the pressure downstream thereof is equal to the output pressure of the proportioning device 10. A non-return valve 17, loaded by a spring 23, is provided at the inlet 6 to each proportioning device. At 18 there is shown a controlling device comprising a diaphragm 19, having its upper face exposed through a duct 19A to the common output pressure of the proportioning devices 10 and its lower face exposed to ambient pressure applied thereto through an inlet 5, the difference being balanced by a spring 20. The diaphragm 19 is operatively connected to a valve 21 for controlling the flow of pressurised air to the motor 22 through an orifice 121 communicating with a conduit 22B leading from, for example, the compressor of a gas turbine engine, in response to changes in the common outlet pressure of the proportioning devices 10. The controlling device 18 controls the speed of the air motor 22 in accordance with deviations in the output pressure of the proportioning devices 10 from a predetermined value. The motor 22 drives all of the proportioning devices 10 through reduction gearing 23.

The operation of the proportioner is as follows:

Assume that the device 10 is proportioning correctly for any particular load due to the engine, for example a gas turbine engine. If, now, more fuel is called for in order to increase engine speed there will be a resulting drop in the output pressure of each proportioning device 10. This drop in pressure will cause the diaphragm 19 to move in an upward direction and allow more air from the compressor to be received by the air motor 22. The air motor 22 will, therefore, increase in speed and enable the proportioning devices 10 to provide the extra fuel required and raise their common output pressure to its previous value. As the output pressure rises the diaphragm 19 will return to substantially its previous position, but, of course, the compressor delivery pressure will now be greater for the same opening of the valve 21, so that the motor 22 will maintain the increased speed. Obviously the diaphragm 19 and valve 21 will move in the reverse direction in the event of increase in the common output pressure of the proportioning devices 10 to reduce the speed of the motor 22 until said output pressure has fallen to its predetermined value.

Changes in altitude will alter the value of the input pressure to each proportioning device 10 supplied by its associated device 13. Each proportioning device 10, is, however, controlled by its valve 15, which is subject to a controlling air pressure which varies with altitude and zero pressure differential is accordingly maintained across the proportioning devices 10 at all altitudes.

A by-pass valve 24 is provided between the input and the output of each proportioning device 10 and is normally held closed by a spring 24A. In the event, however, of the device 10 seizing up, the valve 24 can be manually opened so as to by-pass the seized device 10 and allow fuel to pass to the engine. In this case, of course, there will not be accurate proportioning, but at least the engine will receive an adequate supply of fuel.

The non-return valve 17 associated with each proportioning device 10 is normally held open by the booster pump pressure and will stay in the open position so long as everything is working normally. The valves 17 prevent seepage from one tank to the next in the case where the system is at rest and a number of tanks of unequal head pressure are filled with fuel. In the event of booster pump failure, the non-return valve 17 will be maintained open by engine suction and the associated gear pump 11, 12 will then pump fuel to the engine with some decrease in accuracy of proportioning, but this is preferable to no fuel at all.

The valves 17, 24 associated with each proportioning device are controlled by a cam system 40 illustrated in more detail in Fig. 4 and comprising a pair of cams 41, 42 which are actuable by an electrical actuator 25 of known type. This is capable of assuming alternative positions selected by a system of push buttons for purposes of manual control and also by controls actuated by floats responsive to the level of fuel in the fuel tanks, so as to adjust the position of the cams 40, 41 to effect the desired control of the valves 17 and 24 and also, under certain conditions, to hold the pressure regulating valve 15 fully open.

When the tanks are to be refuelled, fuel will be supplied to the manifold 8 which normally constitutes the common output manifold of the proportioning devices 10 and will, in consequence, rotate the gears 11 and 12 thereof. These in turn will rotate the gears of the air motor 22 and if it were not for the valve 21 pressure would be built up on what is normally the input to the air motor until the air motor prevented the gears 11 and 12 rotating, which would, of course, stop the supply of fuel to the tanks. When, however, fuel under the supply pressure reaches the upper surface of the diaphragm 19 this will cause the valve 21 to move downwardly and thus vent the air motor to atmosphere by means of a vent line 22A.

The cam 41 (Fig. 4) coacts with a rocker 49, pivoted at 43 and having a nose 44 engaging a slot 45 in the upper end of the stem 26 of the non-return valve 17. The cam 42 has a peripheral cam surface which coacts with a tappet 46 (Fig. 2) bearing on a pivotally mounted lever 27. The cam 42 also has a face cam surface which coacts with a rocker 49 (not shown in Fig. 4 but indicated at 47 in Fig. 3) which bears against the stem 48 of the by-pass valve 24.

During proportioning, the cams 41, 42 associated with each proportionary device occupy the position shown in Fig. 4 and the non-return valve 17 is free to open under the pressure of the booster pump, the by-pass valve 24 is maintained closed by its associated spring 24A, and the lever 27 is maintained in a position such that the pressure regulating valve 15 assumes a position determined by the associated diaphragm 14 and spring 16. When, however, the tanks are to be refuelled via the proportioner, each of the actuators 25 is caused, by actuation of the appropriate push-button, to impart clockwise rotation to its cams 41, 42 thereby causing the cam 41 to actuate the rocker 49 to lift the associated non-return valve 17 to the open position. The clockwise movement imparted to the cam 42 does not result in opening of the by-pass valve 24 but nevertheless causes the lever 27 to be rocked to hold the pressure-regulating valve 15 fully open.

When any of the tanks has been filled, a float therein actuates contacts to cause the associated actuator 25 to rotate anti-clockwise beyond the original position shown in Fig. 4 to a third position in which the cam 42 opens the bypass valve 24. In this third position the cam 41 allows the non-return valve 17 to close under the action of its spring 23 and the cam 42 releases the lever 27 so that the pressure regulating valve 15 is again under control of its diaphragm 14 and spring 16. It will be appreciated that as the result of movement of the cams through their original position on their way to the third position, the valve 17 will close before the by-pass valve 24 is opened. During this small interval of time, the by-pass valve 24 can open against its spring 24A to prevent the gears 11, 12 (acting as a pump) from building up excessive pressure in the associated chamber.

When all the tanks have been filled and it is desired to recommence proportioning, push buttons associated with each of the actuators 25 are operated to cause the associated cams 40, 41 to return to the original position shown in Fig. 4. Each actuator is provided with a further push button which can be operated to cause the cams to move to the above-described third position in which the cam 42 opens the by-pass valve 24 to cater for seizure of the gear pump 11, 12 as already noted.

An air separator tank 28 (Fig. 1) is provided so that, in the event of the proportioning device 10 sucking in air during refuelling, this air will pass up through a duct 29 to the top of the tank 28. The resulting drop in the level of the fuel in the tank 28 will cause a float 30 to move downwardly and in so doing open a valve 31. The air pressure will cause a non-return valve 32 to open and allow the air to escape to atmosphere. The non-return valve 32 is necessary to enable the system to be de-fuelled by, for example, a fuel bowser. If it were not for the non-return valve 32 the suction created by the bowser would cause the valve 31 to pull off, with a resulting drop in suction pressure. The non-return valve 32 prevents this as it is then sucked onto its seat.

The proportioner shown in Fig. 3 is similar in principle to that already described, although the gears 111, 112 of each proportioning device 10 are of somewhat different shape. Under some circumstances, the actuator 25 may be unable, when it is desired to refuel, to lift the non-return valve 17 and the pressure regulating valve 15 against the fuel pressure (e.g. 50 p.s.i.) supplied by the refuelling bowser. Provision for this may be made by the incorporation of a non-return valve which will open to by-pass the pressure regulating valve 15 during refuelling. In the arrangement shown in Fig. 3, however, the pressure regulating valve 15 is provided with a second diaphragm 50 of smaller area than the diaphragm 14 and to the undersurface of which the refuelling pressure of the bowser is applied through a duct 51. The pressure so exerted on the diaphragm 50 counteracts the refuelling pressure acting on the upper surface of the diaphragm 14 and assists the valve 15 to rise. During proportioning, the pressure regulating valve 15 will be held open against the fuel pressure acting on the upper surface of the diaphragm 14 by atmospheric pressure and the pressure of the spring 16, and the lower diaphragm 50 will be held down against the seat 52 by atmospheric pressure acting on its upper surface.

A non-return valve 53, having a restricted orifice 54 therein and loaded by a spring 55, is provided in the duct 51, and the non-return valve 17 is provided with a relief valve 56 loaded by a spring 57. As already explained, the non-return valve 17 and the pressure regulating valve 15 close at the conclusion of the refuelling operation and the relief valve 56 can then open, when necessary and provided the valve 17 has closed before the valve 15, to relieve the system of excess pressure. The restricted orifice 54 in the non-return valve 53 ensures that when the actuator 25 operates at the conclusion of refuelling to allow the valves 17 and 15 to close, sufficient pressure is applied to the undersurface of the diaphragm 50 to ensure that the valve 15 will close after the valve 17. A restrictor (not shown) is provided in the port 7 to minimise the flow of fuel through it in the event of either of the diaphragms 14, 15 rupturing.

Air under pressure is supplied to the control valve 21 of the air motor 22 through an orifice 58 controlled by an overspeed valve 59 and then through normally open orifices 60 and 61, controlled by a negative-g valve constituted by a weight 62 formed with a central hole 63. During certain manoeuvres of the aircraft, the force of gravity is neutralised and the fuel rises to the tops of the tanks leaving the bottoms of the tanks, from which fuel is fed by the booster pumps, full of air. This would cause the air motor 22 to race but for the fact that under these conditions the valve 62 moves to close the orifices 60, 61 and shut off the air supply to the motor 22. Of course, a spring may be provided beneath the valve 62 to overcome friction and facilitate upward movement of the valve 62 when gravity is neutralised. The air motor 22 may also tend to race under such conditions, for example when the fuel tanks are empty and the devices 10 pump air instead of fuel. This is prevented by the overspeed valve 59.

The valve 59 is attached to a diaphragm 64 which is normally subjected to equal air pressures on its two sides and a spring 65 normally holds the valve 59 in the open position shown. If, however, the air motor 22 overspeeds, flyweights 66 on the shaft 67 of the air motor operate to open a valve 68 which is normally held closed by a spring 69. Air is then allowed to bleed at a rate controlled by a restrictor 70 from the space to the left hand side of the diaphragm 64 through a conduit 71, the valve 68 and a vent 72, whereupon the diaphragm 64 will move to the left to cause the valve 59 to reduce the supply of air to the air motor 22.

It is sometimes desired in an aircraft to provide facilities for separate withdrawal of fuel from tanks in the wings and from tanks in the fuselage. Thus, while it is usual during takeoff to draw fuel from all the tanks, it is often the practice thereafter to use up the fuel in the fuselage tanks before further fuel is withdrawn from the wing tanks. In this case separate sets of proportioning devices, each with an associated air motor, will be provided for the wing and fuselage tanks. The supply of fuel from the fuselage tanks may then be switched off by stopping the backing pumps associated with wing tanks. Under these circumstances the non-return valves 17 of the associated proportioning devices will tend to remain open under the suction pressure of the engine and the proportioning devices will tend to act as pumps and to prevent this the by-pass valves 24 are opened by operation of the appropriate push buttons associated with the actuators 25. The proportioning devices then tend to overspeed and the governor mechanism shown in Fig. 3 responds by cutting off the air supply to the air motor driving the proportioning devices for the wing tanks. If no such governor mechanism is provided the air supply to the air motor may be cut off manually. Alternatively, arrangements may be made whereby shutting-off of any backing pump automatically causes the associated actuator 25 to move to open the non-return valve 24.

If means are provided whereby the output manifold of the wing tank proportioning devices is cut off from the engine simultaneously with stoppage of the wing tanks backing pumps, the non-return valves 17 will close. Any pressure built up between the proportioning devices and the point at which the output manifold is closed will then act on the device 18 and cause it to cut off the supply of air to the air motor.

What we claim as our invention and desire to secure by Letters Patents is:

1. A mechanical fuel flow proportioner for delivering fuel from a plurality of supply sources to a common outlet and including in association with each source a flow proportioning device comprising intermeshing rotors mounted to rotate within a casing and matched as regards displacement to the associated source, a compressed air motor connected to drive all the flow proportioning devices, a control valve connected between the input to the air motor and a source of pressurized air, a device responsive to the common output pressure of the flow proportioning devices for controlling said valve to maintain said output pressure at a constant value, a pressure regulating valve disposed between each flow proportioning device and its associated source and a device sensitive to the input pressure to each flow proportioning device for adjusting its pressure regulating valve to maintain said input pressure substantially equal to said common output pressure.

2. A fuel flow proportioner according to claim 1, wherein the pressure-sensitive device associated with the control valve is a diaphragm subject at one side to the common output pressure and at the other to the load of a spring and wherein the control valve controls the effective area of an orifice for supplying pressurised air to the air motor.

3. A fuel flow proportioner according to claim 1, wherein the pressure-sensitive device associated with each pressure regulating valve is a diaphragm exposed at one side to said input pressure and at the other to ambient atmospheric pressure and the pressure of a spring.

4. A fuel flow proportioner according to claim 1 comprising an overspeed governor associated with the air motor and means controlled thereby for reducing the flow of pressurised air to the air motor when the air motor overspeeds.

5. A fuel flow proportioner according to claim 4, wherein said governor controlled means comprises an overspeed valve for controlling the flow of pressurised air to the control valve, a spring loaded diaphragm subject on both sides to the pressurised air for controlling the position of the overspeed valve and a valve controlled by the governor and arranged to open to bleed air from said diaphragm when the air motor overspeeds, thereby causing the overspeed valve to move to reduce the flow of pressurised air to the air motor.

6. A fuel flow proportioner according to claim 1, comprising a negative-g valve arranged, when the proportioner is installed in an aircraft flying under conditions such that gravity is neutralised, to cut off the supply of pressurised air to the air motor.

7. A fuel flow proportioner according to claim 1, wherein each source is a fuel tank and comprising in association with each proportioning device a spring-loaded non-return valve situated upstream of the pressure regulating valve and adapted to open under the pressure of fuel supplied to the proportioning device by a backing pump from its associated tank, a normally closed by-pass valve and a cam system operative to open the non-return valve to allow of refuelling of the tank by reverse flow of fuel through the proportioning device, and to cause the non-return valve to close and to open the by-pass valve after the tank has been filled.

8. A fuel flow proportioner according to claim 7, wherein the cam system is also effective to hold the pressure regulating valve fully open during refuelling but to allow it to close when refuelling is completed.

9. A fuel flow proportioner according to claim 7 or claim 8, comprising an electric actuator for the cam system which is controllable to move to different positions under the control of push buttons and also of controls actuated by a float in the tank.

10. A fuel flow proportioner according to claim 9, wherein the actuator is operative by push button control to open the by-pass valve in the event of seizure of the proportioning device.

11. A fuel flow proportioner according to claim 8, wherein the pressure-sensitive device associated with each pressure regulating valve is a diaphragm exposed at one side to the input pressure to its flow proportioning device and at the other to ambient pressure and the pressure of a spring, and wherein the pressure regulating valve is connected to a second diaphragm subject, during refuelling, to the refuelling fuel pressure in the direction tending to open said valve.

12. A fuel flow proportioner according to claim 11, wherein the refuelling fuel pressure is applied to the second diaphragm through a duct containing a non-return valve containing a restricted surface.

13. A fuel flow proportioner according to claim 7, comprising in association with each proportioning device an air separator tank for collecting air drawn in by said device during refuelling and a float-actuated valve in said tank to allow air to escape from the tank through a non-return valve.

14. A mechanical fuel flow proportioner for delivering to a common outlet fuel supplied from a number of sources at different pressures comprising, in association with each source, a rotary flow proportioning device matched as regards displacement to its source, a device associated with said proportioning device for maintaining its input pressure substantially equal to its output pressure, and a normally closed by-pass valve which can be manually opened in the event of seizure of the proportioning device to permit fuel to by-pass the proportioning device, driving mechanism for driving said proportioning devices so that they feed fuel continuously and in predetermined proportions from the several sources to the common outlet, and means responsive to the fluid pressure in said common outlet for adjusting the speed of said driving mechanism so as to maintain said outlet fluid pressure constant.

15. A mechanical fuel flow proportioner for delivering to a common outlet fuel supplied from a number of sources at different pressures comprising, in association with each source, a rotary flow proportioning device matched as regards displacement to its source and a device associated with said proportioning device for maintaining its input pressure substantially equal to its output pressure, a compressed air motor coupled to and driving all of said proportioning devices, a valve controlling admission of air to said motor from a source of pressurized air and a device responsive to the common output pressure of said proportioning devices for controlling said valve to maintain said output pressure at a constant value.

16. A fuel flow proportioner according to claim 15, wherein said motor comprises a pair of intermeshing gears adapted to be rotated to drive said proportioning devices by compressed air supplied to the motor by said valve and said valve is movable to vent said gears to atmosphere to permit said gears to be driven in reverse by the proportioning devices during refuelling of said sources.

17. A mechanical fuel flow proportioner for delivering to a common outlet fuel supplied from a number of sources at different pressures comprising, in association with each source, a rotary flow proportioning device matched as regards displacement to its source and a device associated with said proportioning device for maintaining its input pressure substantially equal to its output pressure, rotatable motor means connected to drive said proportioning devices, means responsive to the common output pressure of said proportioning devices for controlling the speed of said motor means to maintain said output pressure at a constant value, said motor means being rotatable in reverse by said proportioning devices to permit of refuelling of said sources by fuel supplied through said proportioning devices, and means for evacuating air from the fuel supplied to said proportioning devices during refuelling.

18. A mechanical fuel flow proportioner for delivering to a common outlet fuel supplied from a number of sources at different pressures comprising, in association with each source, a rotary flow proportioning device matched as regards displacement to its source, a device associated with said proportioning device for maintaining its input pressure substantially equal to its output pressure, a spring loaded non-return valve situated upstream of said maintaining device and adapted to open under the pressure of fuel supplied to the proportioning device from its source and a normally closed by-pass valve for allowing fuel to by-pass the proportioning device, driving mechanism for driving said proportioning devices so that they feed fuel continuously and in predetermined proportions from the several sources to the common outlet, and means responsive to the fluid pressure in said common outlet for adjusting the speed of said driving mechanism so as to maintain said outlet fluid pressure constant.

References Cited in the file of this patent

UNITED STATES PATENTS

| | | |
|---|---|---|
| 2,564,306 | Isreeli et al. | Aug. 14, 1951 |
| 2,658,644 | Lowe | Nov. 10, 1953 |
| 2,755,740 | McKean | July 24, 1956 |
| 2,800,915 | Tavener | July 30, 1957 |